(12) United States Patent
Beasley, Jr.

(10) Patent No.: US 6,306,462 B1
(45) Date of Patent: Oct. 23, 2001

(54) VEHICLE AIR BAG FABRIC AND METHOD OF MAKING SAME

(76) Inventor: Alonzo W. Beasley, Jr., 104 Chelmsford Dr., Easley, SC (US) 29642

(*) Notice: Subject to any disclaimer, the term of this patent is extended or adjusted under 35 U.S.C. 154(b) by 0 days.

(21) Appl. No.: 09/528,012

(22) Filed: Mar. 17, 2000

Related U.S. Application Data

(62) Division of application No. 09/222,329, filed on Dec. 29, 1998, now Pat. No. 6,074,701, which is a division of application No. 08/787,743, filed on Jan. 24, 1997, now Pat. No. 5,881,776.

(51) Int. Cl.$^7$ ........................................ B05D 3/02
(52) U.S. Cl. ........................................ 427/381; 427/389.9
(58) Field of Search ...................... 427/389.9, 381

(56) References Cited

U.S. PATENT DOCUMENTS

| | | |
|---|---|---|
| 3,799,574 | 3/1974 | Bonn et al. . |
| 3,892,425 | 7/1975 | Sakairi et al. . |
| 4,921,735 | 5/1990 | Bloch . |
| 5,011,183 | 4/1991 | Thornton et al. . |
| 5,073,418 | 12/1991 | Thornton et al. . |
| 5,093,163 | 3/1992 | Krummheuer et al. . |
| 5,110,666 | 5/1992 | Menzel et al. . |
| 5,114,180 | 5/1992 | Kami et al. . |
| 5,131,434 | 7/1992 | Krummheuer et al. . |
| 5,193,847 | 3/1993 | Nakayama . |
| 5,215,795 | 6/1993 | Matsumoto et al. . |
| 5,236,775 | 8/1993 | Swoboda et al. . |
| 5,296,278 | 3/1994 | Nishimura et al. . |
| 5,356,680 | 10/1994 | Krummheuer et al. . |
| 5,375,878 | 12/1994 | Ellerbrok . |
| 5,421,377 | 6/1995 | Bonigk . |
| 5,503,197 | 4/1996 | Bower et al. . |

(List continued on next page.)

FOREIGN PATENT DOCUMENTS

| | | |
|---|---|---|
| 2061810 | 8/1992 | (CA) . |
| 2129258 | 2/1995 | (CA) . |
| 4038287A1 | 6/1991 | (DE) . |
| 0436950A2 | 7/1991 | (EP) . |
| 0442373A1 | 8/1991 | (EP) . |
| 0501295A1 | 9/1992 | (EP) . |
| 0636721 A1 | 2/1995 | (EP) . |
| 2241207A | 11/1990 | (GB) . |
| 2265122 A | 9/1993 | (GB) . |
| 6192938 | 12/1994 | (JP) . |
| 07300054-A2 | * 11/1995 | (JP) . |

OTHER PUBLICATIONS

Database WPI, AN 94–261006, Derment Publications Ltd., London, GB, dated Jul. 12, 1994.

Nishimura et al, Frontal Impact Protection: Seat Belts and Air Bags SAE Special Publications, No. 947, pp. 109–118, 1993.

Anon., Chemiefasern Textilindustrie, 44/96(3), T15 and E19, 1994.

Wahoud et al. Textile Technology, 2(1), pp 26–28, 1994.

Dewispelaere, Industrie Textile 1266(6), pp 33–36, 1995.

*Primary Examiner*—Erma Cameron
(74) *Attorney, Agent, or Firm*—Nelson Mullins Riley & Scarborough

(57) ABSTRACT

Vehicle air bags are constructed of fabric produced according to improved methodology. The fabric, which may be coated or uncoated, is dry woven on a loom machine without size. Since size is not used, the invention provides several methods to reduce chafing of the unprotected yarn during the weaving process. For example, the yarn is preferably of a type having a relatively large number of evenly-spaced nodes of entanglement. The warp ends are preferably beamed at a ratio of no greater than two ends per dent of the beaming comb. At least six (6) weaving harnesses are preferably used on the loom as the fabric is being produced. Because size is eliminated, the fabric does not have to be scoured prior to use. As a result, the air permeability of the fabric remains naturally low and fabric stiffness is reduced.

6 Claims, 5 Drawing Sheets

U.S. PATENT DOCUMENTS

| | | |
|---|---|---|
| 5,508,073 | 4/1996 | Krummheuer et al. . |
| 5,518,814 | 5/1996 | Bonigk . |
| 5,581,856 | 12/1996 | Krummheuer et al. . |
| 5,630,261 | 5/1997 | Beasley, Jr. . |
| 5,637,114 | 6/1997 | Hohnke . |
| 5,650,207 | 7/1997 | Crouch . |
| 5,651,395 | 7/1997 | Graham et al. . |
| 5,657,798 | 8/1997 | Krummheuer et al. . |
| 5,685,347 | 11/1997 | Graham et al. . |
| 5,865,464 | 2/1999 | Kanuma et al. . |

* cited by examiner

VEHICLE AIR BAG FABRIC AND METHOD OF MAKING SAME

CROSS REFERENCE TO RELATED APPLICATIONS

This is a division of application Ser. No. 09/222,329, filed Dec. 29, 1998, now U.S. Pat. No. 6,074,701 which is a division of application Ser. No. 08/787,743, filed Jan. 24, 1997, now U.S. Pat. No. 5,881,776.

BACKGROUND OF THE INVENTION

The present invention relates generally to air bags of the type utilized in vehicle occupant restraint systems. More particularly, the present invention relates to fabric suitable for use in such air bags.

For some time, vehicle manufacturers have been equipping their products with air bag systems to supplement the protection offered by seatbelts. These air bag systems utilize at least one folded air bag in fluid communication with a source of inflation gas. When a collision is detected between the vehicle and another object, the source of inflation gas is actuated to inflate the air bag.

Air bags have traditionally been of two types, i.e., driver side and passenger side. More recently, some vehicle manufacturers have also begun providing air bags designed for side-impact protection. Air bags of a particular type will be constructed to satisfy unique operating characteristics of that type. For example, driver side air bags have frequently been made from coated fabric or uncoated fabric of very low permeability. Passenger side air bags have often been made from uncoated fabric of slightly higher permeability.

Several primary fabrics have been utilized in the production of vehicle air bags. An early fabric widely employed for driver side air bags was woven from 840 denier yarn into a thread count of approximately 25×25 and coated with 1–2 ounces per square yard of neoprene rubber. As demand increased for reduced packaging in driver side applications, the industry moved toward smaller denier yarns of a higher thread count. For example, fabrics woven from 420 denier yarn into thread counts of approximately 49×49 or 46×46 were utilized.

As intended, these 420 denier fabrics successfully provided the reduced packaging sought by vehicle manufacturers. Because the denier and tensile strength of the yarn had been reduced, however, the yarn had to be slashed with a suitable sizing compound, such as polyacrylic acid (PAA), prior to rapier weaving. The greige cloth, stiff and boardy due to the sizing compound, then had to be scoured prior to use. Scouring was also necessary to remove residual spin finish which, along with the size, had a tendency to prevent good adhesion of the neoprene coating compound. With the additional processing of slashing and full scouring, the cost of the fabric was increased.

The additional cost of sizing and scouring was also seen in another important fabric. This fabric, which has been used primarily in passenger side applications, was woven into a 32×32 ripstop configuration from 840 denier yarn. Size was used despite the stout nature of 840 denier yarn because the beat-up at the fell of the cloth was very tight, often causing chafing of unsized yarn during the weaving process.

Much of the world market has traditionally been processed using conventional rapier weaving technology because of its versatility and quality. Typical rapier goods were very dense in construction, like the 49×49 420 denier fabric discussed above, as well as 60×60 315 denier or 41×41 630 denier fabrics.

Recently, some fabric makers began using water jet weaving as an alternative method of producing air bag fabric. An advantage of water jet weaving is that some normal process steps can be eliminated or reduced. For example, improvements in the overall quality of the yarns themselves often allow water jet looms to be run without size on the warp yarns. The chilled water holds and protects the unsized warp yarns during cloth formation, whereas these yarns could be bruised and frayed when run dry on a rapier loom machine. The scouring process can be eliminated since size was not used and the spin finish on the yarns is partially broken down during the weaving process and is brought down to previous market levels of acceptability through normal heat setting of the fabric.

Although water jet weaving has certain advantages, it also has various drawbacks. One significant drawback for air bag fabric is a relatively wide variation in air permeability across the fabric web. In particular, water jet weaving has a tendency to blossom the fabric, particularly at the edges. As such, the side-center-side permeability of the fabric will generally not be as consistent as rapier goods.

In addition, greige cloth produced on a water jet loom must be dried to prevent growth of mildew. In addition, water jet looms have traditionally required a more difficult changeover process when it is desired to weave a different type of fabric on a particular loom. Water jet looms also tend to be less flexible with respect to on-loom constructions and the quality of the fabric can be inconsistent.

SUMMARY OF THE INVENTION

The present invention recognizes the foregoing and other disadvantages of prior art constructions and methods. Accordingly, it is an object of the present invention to provide improved air bags for use in a motor vehicle.

It is also an object of the present invention to provide improved fabrics for use in a vehicle air bag.

It is also an object of the present invention to provide improved methods of producing fabric suitable for use in vehicle air bags.

It is a more particular object of the present invention to provide improved methods of producing air bag fabric using a rapier loom machine.

It is also an object of the present invention to provide improved methods of producing coated fabric suitable for use in vehicle air bags.

It is also an object of the present invention to provide improved methods of producing uncoated fabric suitable for use in vehicle air bags.

Some of these objects are achieved by an air bag for use in a motor vehicle. The air bag comprises a plurality of panels connected together about their respective peripheries to define an interior cavity for receipt of an inflation medium therein. At least one of the panels includes an unscoured fabric having an air permeability of less than approximately 5.0 CFM and a circular bend of less than approximately 2.2.

In some exemplary embodiments, the panel is constructed substantially entirely of uncoated fabric. The uncoated fabric may include polyester yarn, such as 650 denier or 440 denier polyester yarn. Alternatively, the uncoated fabric may includes nylon yarn, such as 420 denier nylon yarn.

Other objects of the invention are achieved by fabric suitable for use in a vehicle air bag. The fabric has a plain weave construction of synthetic multifilament yarn of a size no greater than approximately 650 denier. In addition, the fabric is unscoured and has an air permeability of less than approximately 5.0 CFM, as well as a circular bend of less than approximately 2.2. In some exemplary embodiments, the air permeability falls generally within a range of 1–4 CFM and the circular bend falls generally within a range of 1.1–2.2.

Still other objects are achieved by a method of making a fabric constructed of multifilament synthetic yarn and suitable for use in a vehicle air bag. One step of the method involves providing a beam of warp yarns that are unsized throughout substantially their entire length. A cloth is produced from fill yarns and the warp yarns utilizing a rapier loom machine having at least six (6) harnesses for producing an alternating shed through which the fill yarns are inserted. Preferably, the rapier loom machine has a number of harnesses falling in a range of six (6) to ten (10). More than ten (10) harnesses may be used, but will often not be preferred because of a tendency to slow loom operation. For example, the rapier loom machine may be equipped with eight (8) harnesses. The cloth may then heat set without scouring.

According to preferred methodology, the yarn utilized in the fabric may exhibit certain desirable characteristics. For example, at least the warp yarns may have approximately evenly-spaced nodes of entanglement along a predetermined length. Depending on various factors, approximately twelve (12) to twenty-five (25) of such nodes of entanglement per meter of yarn is generally suitable for this purpose.

The multifilament synthetic yarns may be polyester yarns. In some cases, these polyester yarns will preferably have a dry air shrinkage rate of at least approximately eight (8) percent. For example, the yarns may have a dry air shrinkage rate falling within a range of approximately eight (8) to ten (10) percent.

In other cases, the multifilament synthetic yarns may be nylon yarns. Prior to heat setting, the nylon yarns are preferably dipped in a water bath to facilitate moisture equilibrium since nylon is typically hygroscopic in nature.

The warp yarns may be sized only on a preselected initial length to facilitate drawing into the harnesses. Preferably, this preselected initial length is no greater than approximately thirty (30) yards.

To achieve a relatively low permeability fabric, the cloth may be woven with the fill yarns and the warp yarns each being maintained in a tension of at least approximately seventy (70) grams. For example, the yarn tension may fall within a range of about seventy (70) grams to ninety (90) grams.

Other objects of the invention are achieved by a method including the step of providing a plurality of section beams of multifilament synthetic yarn. A warp beam may be produced from the section beams by passing individual yarns of the section beams through a beaming comb at a ratio of no greater than two (2) yarns per dent. Individual yarns of the warp beam produced in this manner are unsized throughout substantially their entire length. The warp beams are then used to produce a cloth in a rapier loom machine having at least six (6) harnesses for producing an alternating shed. The cloth may then be heat set without scouring.

Objects of the invention are also achieved by a method of making a coated air bag fabric. The method involves utilizing a rapier loom machine to produce a cloth from a preselected multifilament synthetic yarn. The yarn may be larger, but preferably has a size no greater than approximately 650 denier. The cloth is produced without using size on the warp yarns and then heat set without scouring. After heat setting, the cloth is coated with a selected coating material such that the resulting fabric is substantially impermeable to passage of fluid. The selected coating material is preferably chosen from a group consisting of silicone, urethane and neoprene. The heat setting and coating may preferably be performed sequentially in a continuous coating line.

Other objects of the invention are achieved by fabrics made according to the various methodology described herein. Still further objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
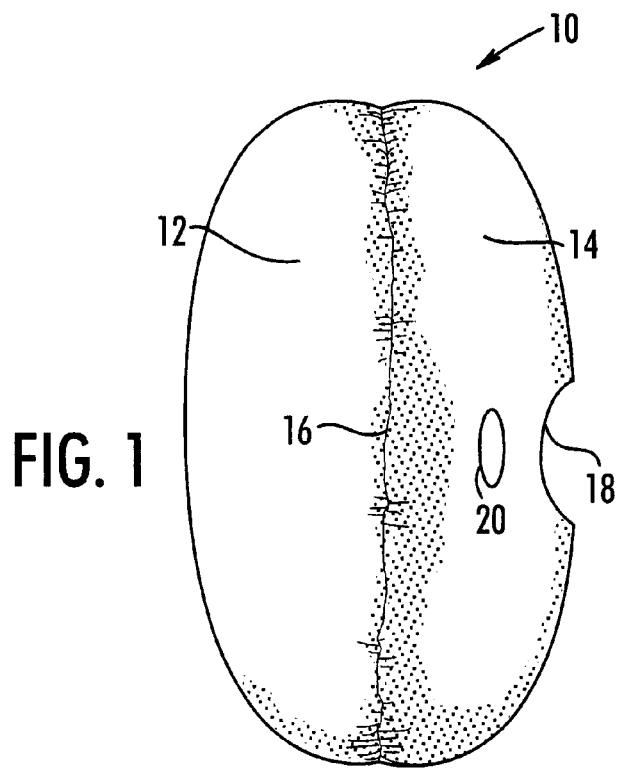
FIG. 1 is a side elevation of a driver side air bag such as may be produced utilizing fabric of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary aspects only, and is not intended to limit the broader scope of the present invention, which broader scope is embodied in the exemplary aspects.

FIG. 1 illustrates a typical driver side air bag 10 that may be constructed of fabric made according to the present invention. Air bag 10 includes a front panel 12 which is attached to a back panel 14 along a seam line 16. Back panel 14 defines an inflator hole 18 to provide fluid communication with a source of inflation gas. Front panel 12 and back panel 14 may be constructed of fabric which has been coated with an elastomeric resin to be practically impermeable to passage of air. Accordingly, vent holes, such as vent hole 20, are defined in back panel 14 to expel the inflation gas so that air bag 10 will deflate when impacted.

In other embodiments, one or both of front panel 12 and back panel 14 may be produced from uncoated fabric. It will often be desirable in such embodiments that at least front panel 12 exhibit a relatively low permeability to prevent passage of excessive particulate and inflation gas. The permeability of back panel 14 can be selected to allow controlled deflation of the air bag without vent holes.

Figure 2:
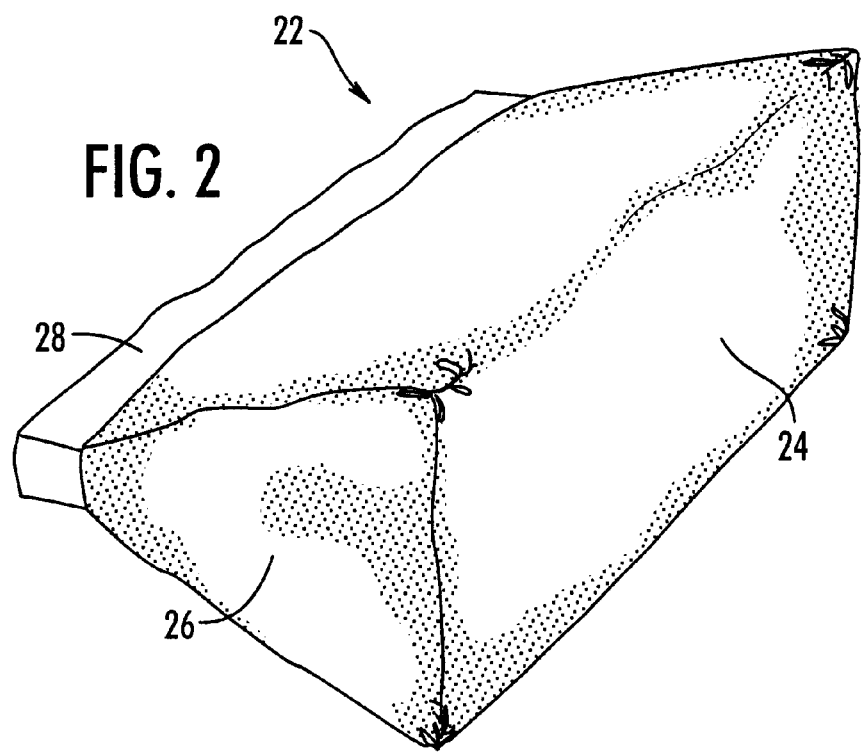
FIG. 2 is a perspective view of a passenger side air bag such as may be produced utilizing fabric of the present invention.

FIG. 2 illustrates a passenger side air bag 22 such as may be constructed of fabric of the present invention. A body panel 24 forms a top, front and bottom portion of air bag 22. A left side panel 26 and a similar right side panel (not shown) are stitched or otherwise attached to body panel 24. Air bag 22 further includes a snout assembly 28 to provide fluid communication with the source of inflation gas.

With the present invention, air bag fabrics of smaller deniers, typically 650 denier and below, can be effectively woven on a rapier loom machine without the need for size. Because the warp yarns are run without size, there is no need to scour the greige cloth produced by the loom. Thus, at least two steps in the traditional rapier weaving process can be omitted according to the present invention.

In addition to cost savings due to fewer process steps, the elimination of scouring yields certain advantageous properties in the fabric itself. In particular, fabric made according to the present invention will tend to be demonstrably softer than scoured fabric produced on rapier loom machines. In addition, the fabric will typically exhibit more consistent and lower air permeability characteristics than uncalendered fabrics of the prior art.

While nylon has excellent melt point and elongation properties, it tends to be more expensive than other synthetic yarn materials, such as polyester. While changes in inflator technology have reduced the need for the multifaceted properties of nylon, it has continued to be widely used. One reason for this continued use of nylon is that scouring, previously believed to be necessary in rapier weaving, may deleteriously affect polyester. Because scouring is eliminated with the present invention, more widespread use of polyester can be achieved.

Figure 3:
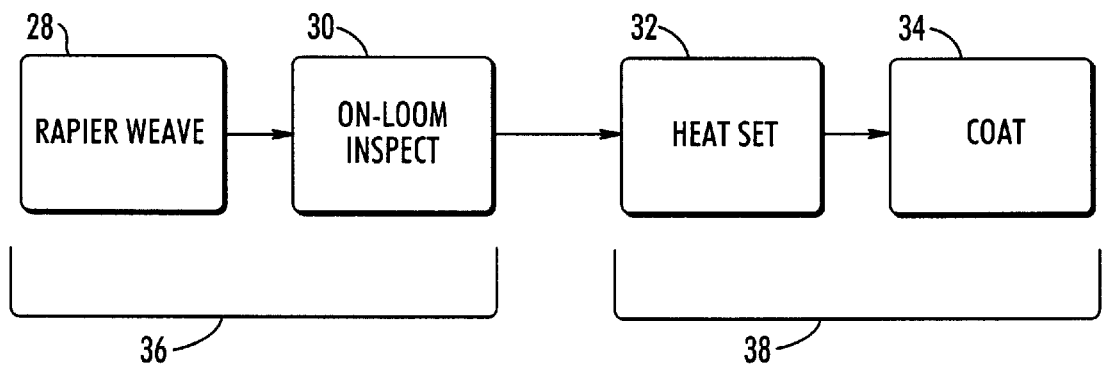
FIG. 3 is a flow chart showing exemplary process steps in producing a coated air bag fabric according to the present invention.
Figure 4:
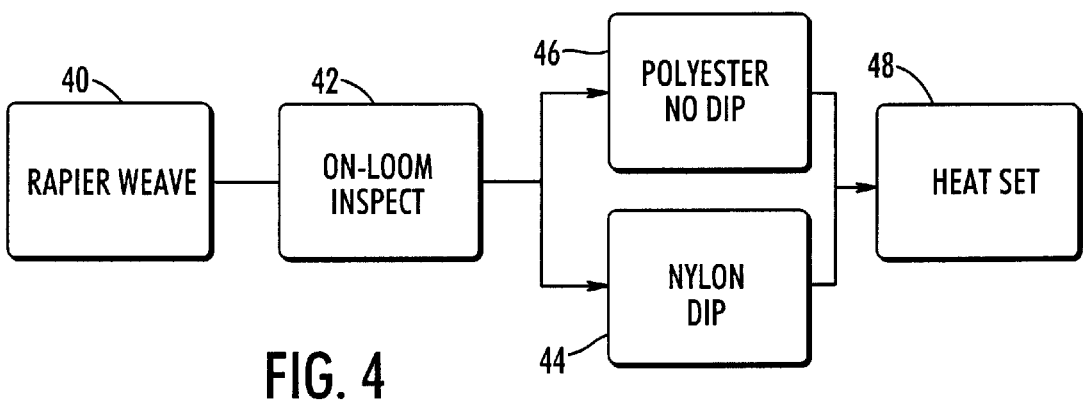
FIG. 4 is a flow chart showing exemplary process steps in producing an uncoated air bag fabric according to the present invention.

FIGS. 3 and 4 diagrammatically illustrate the process steps involved in producing coated and uncoated fabric according to the present invention. Referring particularly to FIG. 3, greige cloth is first woven on a rapier weave machine without size, as indicated at 28. As indicated at 30, the greige cloth may be advantageously inspected on loom as it is being made. The greige cloth is then heat set, as indicated at 32, to yield stability and shrink the fabric to a finished construction.

As indicated at 34, the fabric may then be coated with an appropriate coating material, such as silicone, urethane or neoprene. In the past, scouring was viewed as necessary during the production of coated fabric to eliminate residual spin finish or other extractibles left on the yarn. In particular, extractible levels greater about 0.5% (which would typically be present in unscoured yarn) often prevented good adhesion of the coating compound to the fabric. Some newer coating compounds, particularly silicone coatings, achieve good adhesion at higher extractible levels.

A particular advantage of the present invention may be readily appreciated from FIG. 3. The coating line installed in many industrial facilities may be equipped with a tenter oven upstream of the location at which the coating is to be applied. Since the greige cloth is not scoured, there is no need for drying and heat setting by the fabric manufacturer. Thus, the fabric can be shipped directly to the coater for heat setting in the continuous coating line. The steps performed by the fabric manufacturer and the coater under this divided production scheme are respectively indicated at 36 and 38.

FIG. 4 illustrates the production of an uncoated fabric according to the present invention. Like the coated fabric, uncoated fabric is also produced by weaving on a rapier loom machine without size on the warp yarns, as indicated at 40. As the greige cloth is being woven, it may be inspected on loom as indicated at 42. If the fabric is being made from nylon yarn, it is then preferably dipped in a water bath, as indicated at 44, to provide moisture equilibrium. As indicated at 46, this step can be eliminated for polyester yarn due to its hydrophobic nature. The greige cloth may then be heat set as indicated at 48.

As noted above, sizing of the warp yarns has previously been necessary when weaving on a rapier loom machine to prevent excessive chafing of the yarn during the weaving process. In order to successfully run unsized warp yarn on a rapier loom machine, the present invention seeks to minimize chafing which could otherwise occur. Preferably, the yarn selected for use in the fabric will itself have certain characteristics which tend to reduce such chafing.

Figure 5:
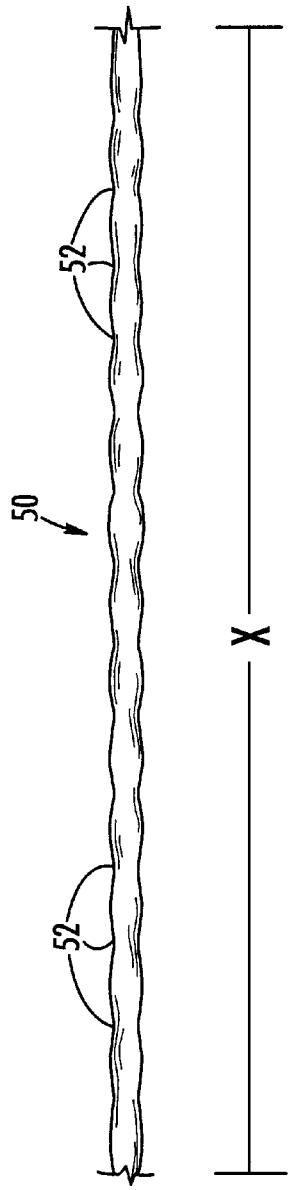
FIG. 5 is a side elevation of a length of multifilament synthetic yarn such as may be used to produce air bag fabric according to the present invention.

For example, FIG. 5 illustrates one such yarn 50 having nodes of entanglement 52 that are evenly spaced along a predetermined length X. Preferred yarns of this type may have twelve (12) to twenty-five (25) evenly spaced nodes of entanglement per meter. This is in contrast to many yarn constructions in which each meter of length may have several closely spaced nodes of entanglement and several others that are spaced more widely apart. Suitable nylon yarns of this type are available from DuPont, with polyester yarns of this type being available from Hoechst Celanese Corporation.

Figure 6:
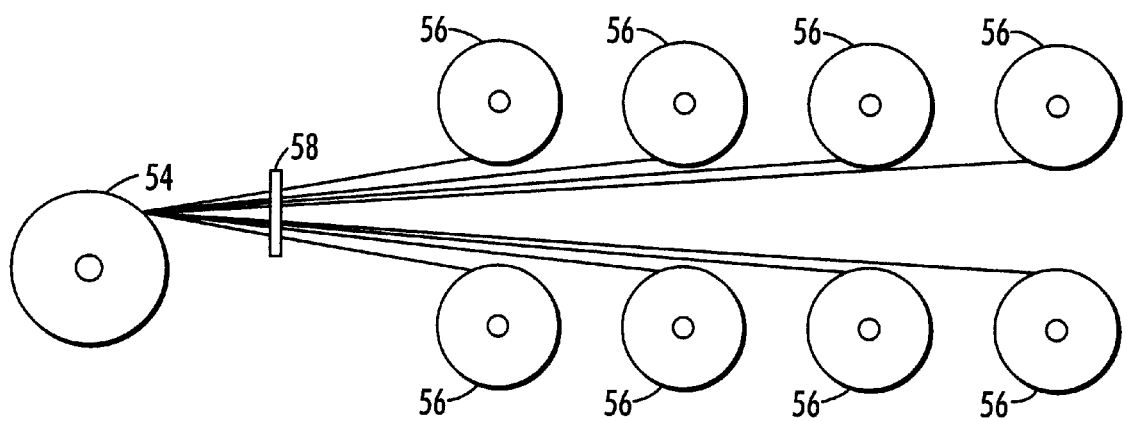
FIG. 6 is a diagrammatic representation of a warp beam being produced according to the present invention from a plurality of section beams.

Prior to weaving, a warp beam is produced having many ends of yarn. This beaming process, which is also implemented to reduce yarn chafing during the weaving process, is illustrated in FIG. 6. Specifically, warp beam 54 having a predetermined number of ends is produced from a plurality of section beams 56 each having a fractionally smaller number of ends. The yarns from section beams 56 pass through a comb 58 which aids in aligning the warp ends as they are wound onto warp beam 54.

Figure 7:
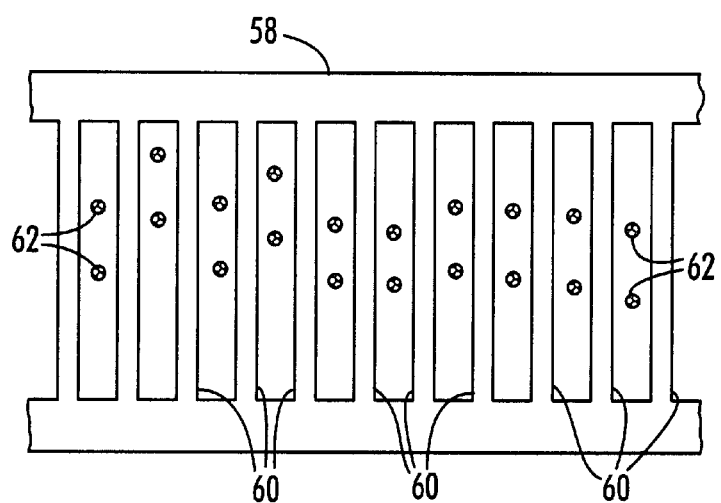
FIG. 7 is a front elevation showing a portion of a beaming comb being utilized to produce a warp beam as in FIG. 6.

FIG. 7 illustrates an enlarged view of a portion of comb 58 showing a plurality of dents 60 formed therein. As can be seen, ends 62 are distributed in dents 60 at the rate of two ends per dent. Often warp beams of sized goods are formed having four ends or more at each dent of the beaming comb. According to the present invention, it has been found that beaming with no more than two ends per dent reduces crossing of the warp ends on the warp beam thus produced. This reduced crossing results in less chafing of the yarns during the weaving process, reducing the need for size.

After the warp beam is formed, a draw-in machine is generally used to draw the ends through the various equipment that will be installed on the loom. With some fabrics, particularly polyesters and smaller denier nylons, it will often be desirable to size a preselected initial length of the warp ends with a sizing compound. For example, the first thirty (30) yards or less of the warp ends can be treated with size to facilitate the draw-in operation and minimize rolling of ends due to the natural static retained in the unsized yarn.

Greige cloth made with this portion of the warp will be discarded so that scouring can be eliminated.

Figure 8:
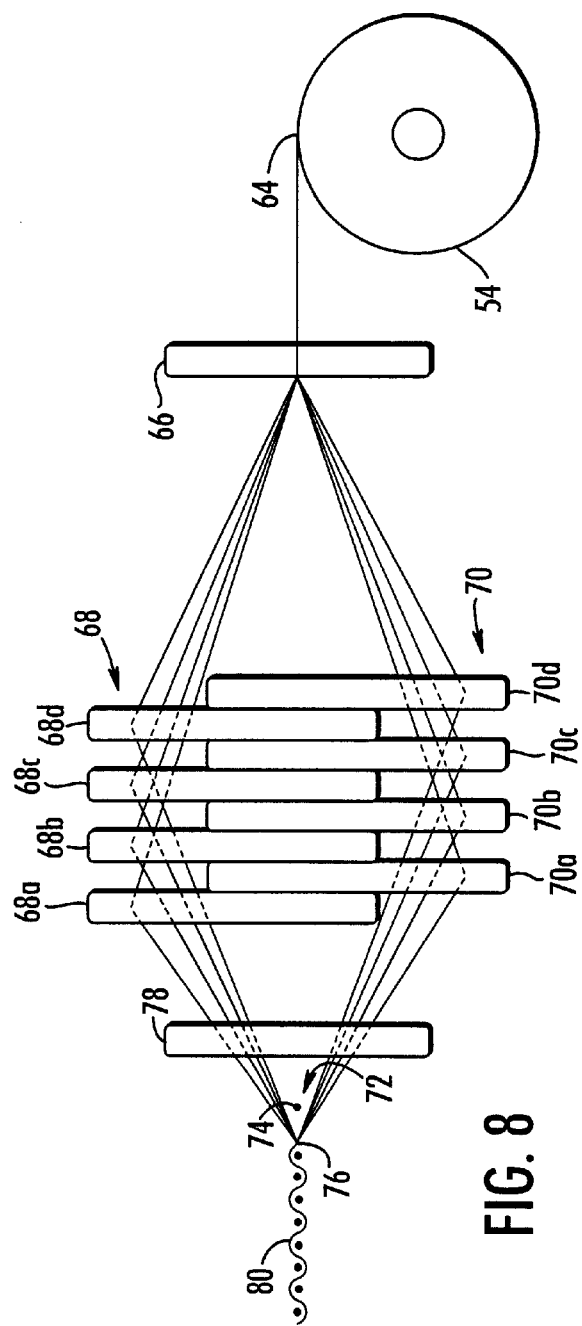
FIG. 8 is a diagrammatic representation illustrating weaving of an air bag fabric according to the present invention utilizing a rapier loom machine.

The weaving process itself is diagrammatically illustrated in FIG. 8. As shown, the warp ends extend into the loom from location 64 at the tangent of warp beam 54. From this location, the individual warp ends extend through drop wires (mounted in frame 66) into a plurality of alternating weaving harnesses indicated generally at 68 and 70. To further reduce chafing, the drop wires may be omitted from the loom.

In this case, a total of eight (8) such harnesses are provided, indicated at 68a–d and 70a–d. Generally, the total number of harnesses utilized for unsized rapier weaving according to the present invention should fall within a range of six (6) to ten (10). This is in contrast to prior art rapier weaving of air bag fabric where no more than four (4) harnesses were generally used at any one time.

As is well known, each harness contains a number of heddles through which individual warp ends respectively pass. The heddles either raise or lower the respective warp end during the reciprocating movement of the associated harness. In the illustrated "snapshot" of the weaving process, harnesses 68 have pulled their warp ends up, whereas harnesses 70 have pulled their warp ends down. As a result, a shed 72 is produced through which a fill yarn 74 can be inserted.

Because this is a rapier loom machine, the fill yarn 74 is carried through the shed by either a single or double rapier. Fill yarn 74 is then beatup against the cloth fell, indicated at 76, by a reed 78. Reed 78 should be a high-quality reed that offers low surface friction to further reduce yarn chafing. Harnesses 68 and 70 then reciprocate to alternate the shed so that the process can be repeated. The greige cloth thus produced is indicated at 80. In this case, a plain weave fabric is being produced, although other suitable weaves, such as a ripstop weave, are also contemplated within the scope of the present invention.

Providing additional harnesses in the rapier loom machine as set forth above provides many important benefits to the success of the unsized weaving process. The yarns will tend to rub against each other less as the shed changes direction. In addition, the yarns are at different angles from the whip roll or drop wires which provides a split sheet effect on the warp side of the loom. As the yarn passes through the heddles, the ends in the latter or back harnesses (such as 68c–d and 70c–d) approach fell 76 at a lower degree of pitch or angle which reduces yarn abrasion. Such abrasion may be reduced by approximately twenty (20) to forty (40) percent depending on the yarn type and the end count of the warp. As the yarns cross in the weaving process itself, or are suspended in either the up or down position, the yarns do not rub in the shed because the are offset by the degree of angle.

In some situations, greige cloth 80 may be used directly without the additional step of heat setting. However, as described above, heat setting is advantageous to provide stability to the fabric and shrink the yarn down to a finished construction. In one aspect of the invention, polyester yarn having a dry air shrinkage of at least eight (8) percent, and often less than ten (10) percent can be used to achieve advantageous shrinkage that would otherwise occur during the scouring process. For fabrics that are to be coated with certain elastomeric compounds, heat setting may also be desirable to slightly reduce the level of spin finish in the yarns which could otherwise affect adhesion of the coating compound.

The elimination of size and subsequent scouring makes the fabric extremely soft and will display a circular bend characteristic lower than that of comparable scoured goods. One reason for this softness is believed to be the somewhat higher levels of spin finish in comparison with prior art fabrics. This spin finish acts as a lubricant, giving the fabric a more pleasing hand.

Air permeability will often be lower and more consistent than both scoured and water jet woven goods because the fabric has not been acted upon by the scouring solution or the water jet, as the case may be. Scouring has a tendency to "bulk" the fabric yarns, opening the fabric interstices. Water jet weaving often causes the yarns to "blossom," particularly at the outer edges, which also increases permeability at these locations. With such prior art fabrics, it was generally believed necessary to calender the fabric in order to achieve consistent permeability at relatively low levels. Fabric produced according to the present invention can consistently achieve lower permeabilities because the individual yarns tend to remain flat and unblossomed.

Figure 9A:
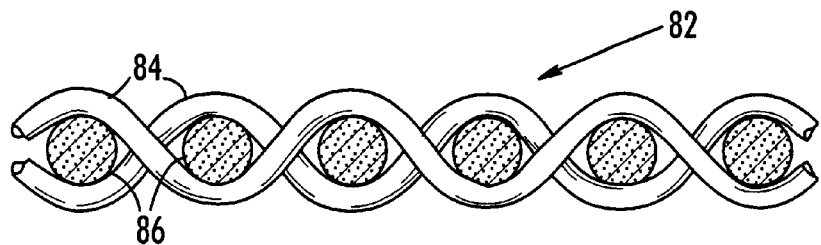
FIGS. 9A and 9B diagrammatically illustrate respective fabrics produced according to low tension weaving and high tension weaving utilizing a rapier loom machine as in FIG. 8.

It should be appreciated that a number of factors, such as yarn denier and thread count, are relevant to the final permeability exhibited by a particular fabric. Permeability values can be further reduced, however, by increasing the tension of the warp and fill yarns above levels generally used in the prior art. FIG. 9A illustrates a fabric 82 in which the yarn tension is maintained within traditional levels of fifty (50) to eighty (80) grams in each direction. In this case, both warp yarns 84 and fill yarns 86 display a somewhat more circular cross section yielding larger interstices in the fabric.

Figure 9B:
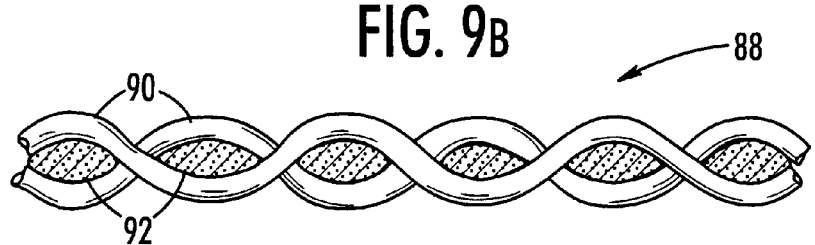

This is in contrast to fabric 88 illustrated in FIG. 9B in which the yarn tension during the weaving process has been raised. As a result, the fabric interstices are smaller, reducing overall permeability. Generally, tension may be maintained at levels of at least approximately seventy (70) grams during weaving in accordance with the present invention. Often, the tension will fall within a range of approximately seventy (70) grams to ninety (90) grams.

Figure 10A:
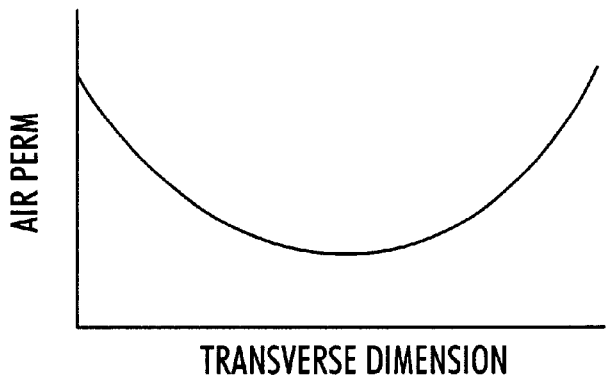
FIG. 10A is a graph illustrative of a typical side-center-side permeability characteristic produced by sized rapier weaving or water jet weaving.

In addition to raising the overall permeability of the fabric, scouring or water jet weaving also tend to cause a greater variation in the permeability of the fabric across its transverse dimension. In other words, the longitudinal regions adjacent the selvage of the fabric will tend to have a higher permeability than the longitudinal region in the center. This is graphically illustrated in FIG. 10A.

Figure 10B:
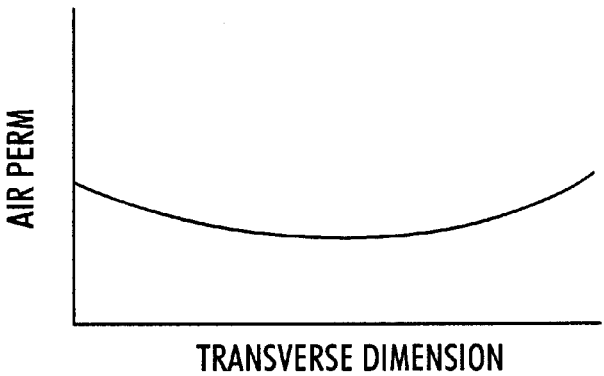
FIG. 10B is a graph similar to FIG. 8A illustrative of a typical side-center-side permeability characteristic produced by unsized rapier weaving according to the present invention.

Because fabric of the present invention is woven with a rapier loom machine and not subsequently scoured, the side-center-side permeability of the fabric will tend to be more uniform, as illustrated in FIG. 10B.

The present invention will now be described in conjunction with some specific fabric constructions that may be produced. For purposes of comparison, these specific fabrics will be discussed in relation to corresponding goods produced on a rapier loom machine with size and subsequent scouring. Each of these fabrics will be set forth in the following Examples.

EXAMPLE I

A 650 denier polyester having a 41×41 (±2 ends or picks) plain weave construction produced according to the present invention will typically exhibit an air permeability of approximately 1–3 CFM (at ½" of water). The circular bend of this fabric will generally fall in a range of 1.7–2.2 (pounds of force using ASTM-D4032). A corresponding fabric made with size and subsequent scouring generally exhibits an air permeability of 5–9 CFM and a circular bend of about 2.5–4.

EXAMPLE II

A 440 denier polyester having a 49×49 (±2 ends or picks) plain weave construction produced according to the present invention will typically exhibit an air permeability of approximately 2–5 CFM (at ½" of water). The circular bend of this fabric will generally fall in a range of 1.5–2.2 (pounds of force using ASTM-D4032). A corresponding fabric made with size and subsequent scouring generally exhibits an air permeability of 5–9 CFM and a circular bend of about 2.5–3.5.

EXAMPLE III

A 420 denier nylon having a 46×46 (±2 ends or picks) plain weave construction produced according to the present invention will typically exhibit an air permeability of approximately 1–4 CFM (at ½" of water). The circular bend of this fabric will generally be about 1.1 (pounds of force using ASTM-D4032). A corresponding fabric made with size and subsequent scouring generally exhibits an air permeability of 5–11 CFM and a circular bend of about 1.5.

It should be appreciated that the above Examples are offered merely for purposes of illustration, and are not intended to limit the teachings of the present invention. For example, a 41×41 product could be produced in a 630 denier nylon if high-shrink yarn, i.e., 8% or greater, could be obtained. A 49×49 fabric can also be produced from high-shrink nylon yarn. For example, Type 729 yarn exhibits a shrinkage of about 9–10%. This particular yarn also has a larger number of filaments (i.e., 136 filaments) in the yarn bundle.

It can thus be seen that the invention provides improved technology for constructing fabric for use in vehicle air bags. While presently preferred embodiments of the invention and presently preferred methods of practicing same have been shown and described, it should be understood that variations and modifications may be made thereto by those of ordinary skill in the art. In addition, it should be understood that aspects of the various embodiments may be interchanged both in whole or in part. Furthermore, those of ordinary skill in the art will appreciate that the foregoing description is by way of example only and is not intended to be limitative of the spirit and scope of the invention so further set forth in the following claims.

What is claimed is:

1. A method of making a coated air bag fabric, said method comprising steps of:

(a) utilizing a loom machine to dry weave a cloth from a preselected multifilament synthetic yarn of a size no greater than approximately 650 denier, warp yarns of said cloth being unsized;

(b) heat setting said cloth without scouring of same; and (c) coating said cloth with a coating material such that said fabric resulting therefrom is substantially impermeable to passage of fluid.

2. A method as set forth in claim 1, wherein steps (b) and (c) thereof are performed sequentially in a continuous coating line.

3. A method as set forth in claim 2, wherein said coating material is chosen from a group consisting of silicone, urethane and neoprene.

4. A method as set forth in claim 1, wherein said loom machine has a number of harnesses falling in a range of six (6) to ten (10).

5. A method as set forth in claim 1, wherein said loom machine is a rapier loom machine.

6. A coated fabric produced by the method of claim 5.

* * * * *